Aug. 9, 1955 — R. C. RUSSELL — 2,715,217
SHIFT INDICATOR
Filed Jan. 2, 1953 — 3 Sheets-Sheet 1

INVENTOR.
ROBERT C. RUSSELL
BY
ATTORNEYS

United States Patent Office 2,715,217
Patented Aug. 9, 1955

2,715,217

SHIFT INDICATOR

Robert C. Russell, South Euclid, Ohio, assignor to Eaton Manufacturing Company, Cleveland, Ohio, a corporation of Ohio Application January 2, 1953, Serial No. 329,345

9 Claims. (Cl. 340—52)

This invention relates to gear shifting mechanism and more particularly to mechanism having shift position indicating means in association therewith.

Broadly the invention comprehends the provision of pre-selection gear shifting mechanism and a switch operated signal light associated therewith for indicating the completion of a pre-selected up-shifting of a multiple speed transmission.

It has been determined that a large percentage of the operators of trucks having two speed axles are not obtaining the full benefit of such axles through faulty timing in the acceleration of the vehicle engine prior to the completion of a pre-selected up-shifting of the axle. Through the utilization of a visual signal light adapted to be suitably arranged in the passenger compartment of the vehicle, as herein devised, operated in accordance with the completion of movement of a shift lever corresponding with the completion of an up-shift, the operator of the vehicle becomes immediately cognizant that said shift is completed and it is suitable for him to accelerate the vehicle and thus obtain the maximum driving benefit through the use of said two speed axle.

Among the objects of the invention is the provision of a pre-selection gear shifting mechanism for multiple speed transmissions, such as, two speed axles having a switch operated signal light associated therewith, that a. Provides a ready visual indication of a completed up-shifting of the transmission;

b. Provides a simple and effective way of indicating to an operator of a vehicle employing same that a pre-selected shift is completed and an acceleration of the vehicle in the higher gear can proceed;

c. Provides means by which the proper and most efficient operation of a vehicle employing same can be obtained; and d. Provides for the lighting up of the signal light to visually indicate to the vehicle operator that the pre-selected shift he made has been completed.

Other objects and advantages of the invention will appear from the following description taken in connection with the drawings forming a part of the specification, and in which.

Similar reference characters indicate corresponding parts throughout the several views of the drawings.

Figure 1:
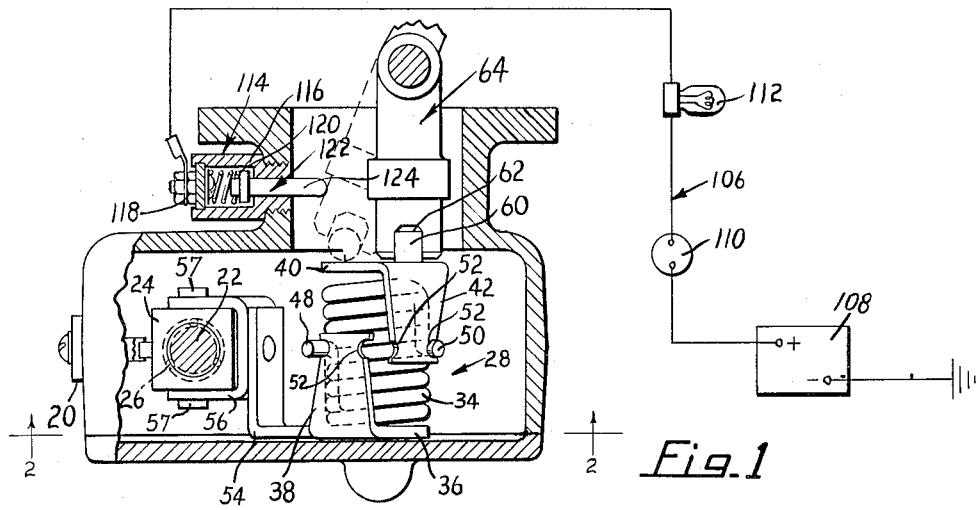
Fig. 1 is a top elevation partly cross-sectionalized view of a portion of a pre-selection gear shifting mechanism having a switch operated signal light switch associated therewith.

This invention was devised for the purpose of easily and economically deriving the fullest benefit from the use of two speed axles in vehicles, such as trucks and the like. By the use of a signal light operated in accordance with a predetermined shift completed position, it is possible to quickly, visually inform the vehicle operator that a pre-selected up-shift that he has made has been completed whereupon he can immediately accelerate the vehicle's engine and derive the most benefit from his newly shifted gear position. This visual indication is provided solely for up-shifting, since it is during this phase of operation that the torque transmitted through the shiftable element has to be materially reduced from that normally transmitted before pre-selection shifting spring power storing means can operate to effect the desired up-shift. Gear shifting mechanism of the type disclosed and claimed by my Patent No. 2,462,779 is herein utilized in association with the shift position operated signal light.

Referring to the drawings for more specific details of the invention 10 represents generally a gear shifting mechanism including a reversible electric motor 11 which is supplied current from a battery 12 arranged in a circuit 14. A key operated switch 16, a two position motor control switch 18 and a trip switch mechanism 20 are arranged in the circuit, the purpose of which will hereinafter appear.

An outer peripheral surface helically grooved screw 22, is connected to the output of the motor so as to be driven thereby and an inner peripheral surface circumferentially grooved nut 24 is in engageable association with the screw by way of balls 26 seating in the grooves of the nut and screw whereupon rotation of the screw provides for the axial movement of nut 24, wherein the nut is restrained from rotation.

A spring tensioning mechanism 28 includes a pair of coaxial relatively rotatable end abutting members 30 and 32 having a torsion spring 34 connected therebetween. The member 30 includes a radial arm 36 having an axially extended finger 38 at the outer extremity thereof whereas the member 32 includes a radial arm 40 having an axially extended finger 42 arranged in axial and radial overlapping relation to the finger 38 on member 30.

Figures 2, 3:
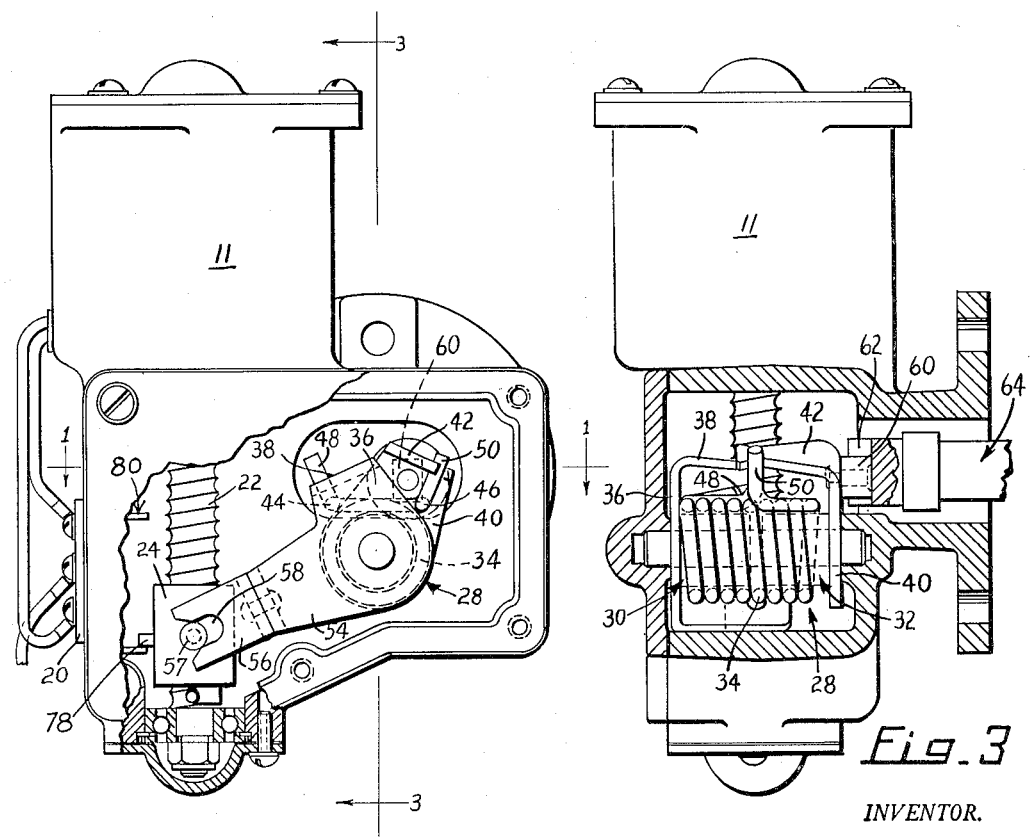
Fig. 2 is an end partly broken away and partly cross-sectionalized view of the gear shifting mechanism of Fig. 1.
Fig. 3 is a cross-sectional view taken substantially along lines 3—3 of Fig. 2.

As noted in Figs. 1 through 3, the spring 34 is arranged in freely surrounding relation on the hubs of members 30 and 32 axially between the arms 36 and 40 thereof. The spring 34 has its opposite ends 44 and 46 brought radially outside of the coil, then bent axially inwardly toward one another and then radially outwardly so as to have the axes of the radially outwardly extending portions 48 and 50 lie in a radial plane of the members 30 and 32 angularly spaced from one another. Portions 48 and 50 of spring 34 project radially beyond the fingers 38 and 42 of the members 30 and 32 and are received in appropriate notches 52 provided on opposite sides of fingers 38 and 42.

Because of the construction provided it will be evident that the member 30 may be turned in either direction of rotation and since finger 38 can pass under the finger 42 it can engage either portion 48 or 50 of spring 34 and apply a turning force to the spring in either direction as a result thereof.

Member 30 includes in addition to arm 36, an arm 54, angularly spaced from arm 36, having a yoke 56 connected at its extremity, with the yoke in turn receiving oppositely disposed pins 57 of nut 24 in slots 58 provided in its free end. This interconnection of the nut 24 and yoke 56 provides for the rotation of yoke 56, arm 54 and member 30 upon axial movement of the nut 24 as induced by rotation of screw 22.

Arm 40 of member 32 has a rectangular shaped collar 60 rotatably supported thereon adapted to be received in a socket 62 of a double armed lever 64, one end 66 of which is yoked and fits over the axially outer end of a shiftable sleeve 68, forming a part of a two speed axle 70. Lever 64 is secured to a shaft 72, which shaft is in turn journalled in an appropriate housing 74 permitting of the rotation of the lever 64 effective to shift sleeve 68 axially upon the movement of socketed end 62 of arm 76 of lever 64 as induced by the rotation of arm 40 under the influence of the power stored in spring 34.

As a means of controlling the operation of motor 11 for the proper actuation of screw 22 and the other apparatus influenced by the movement thereof, trip switch mechanism 20 is controlled by movement of the nut 24 wherein a pin 78 arranged therein is engageable at predetermnied end limits of travel of the nut to engage trip lever means 80 of the switch mechanism 20.

Control switch 18 is appropriately mounted on a gear shift lever 82 so as to be handy for the operation thereof in conjunction with the shifting of the gears of a transmission, not shown, of the vehicle employing the two speed axle and gear shifting mechanism herein disclosed and defined. The switch 18 and switch mechanism 20 are properly interrelated in the electrical circuit therefor so that whereas the movement of switch 18 operates to effect a predetermined rotation of the motor 11, the switch mechanism 20 as controlled by the movement of nut 24 stops the rotation of the motor and thereby necessitates the opposite movement of switch 18 for the reverse rotation of the motor. This actuation of switch 18 accounts for the shifting of sleeve 68 to effect a change in the gear ratio operation of the two speed axle 70 by way of the spring tensioning mechanism 28.

Figure 4:
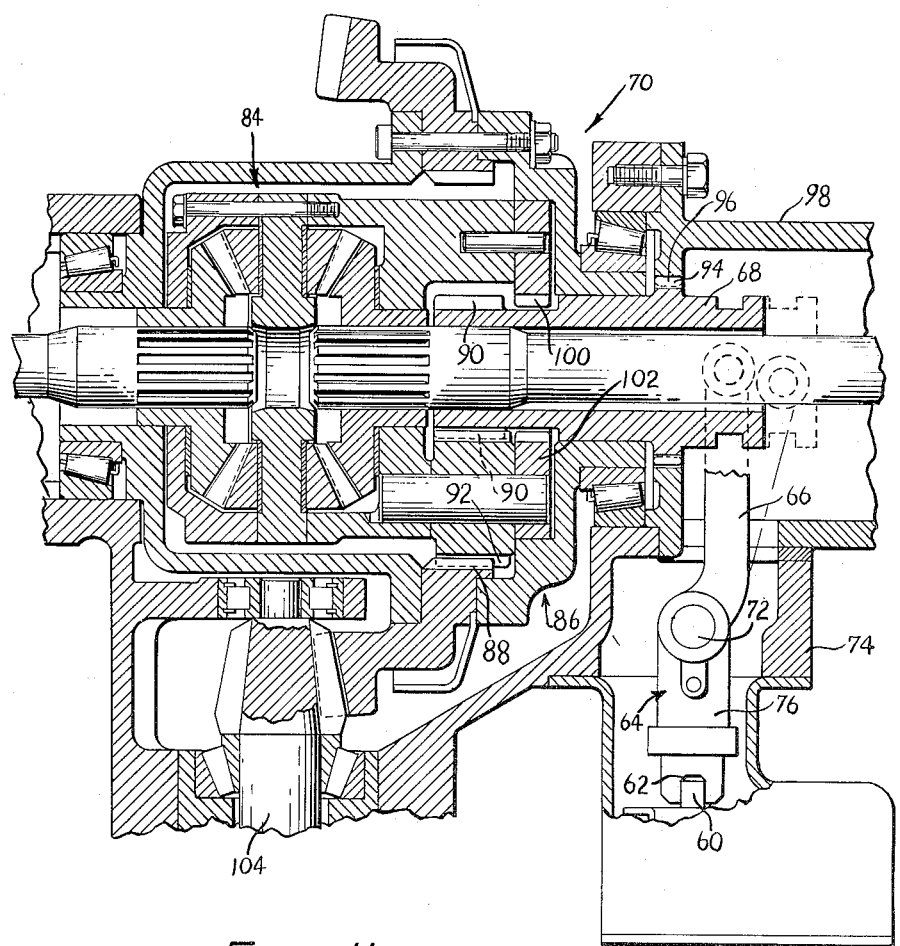
Fig. 4 is a fragmentary cross-sectional view of a two-speed axle adapted to be shifted by the mechanism of Figs. 1 through 3.

The two speed axle 70 provides in addition to the basic differential gearing 84 a change speed mechanism in the form of a planetary gear system 86 including meshing ring, sun and planet pinion gears 88, 90 and 92 respectively. Sun gear 90 forms a part of sleeve 68 and as shown in Fig. 4 is in meshing engagement with the planet pinions 92. Simultaneously herewith jaw clutch teeth 94 formed on the outer periphery of sleeve 68 axially spaced from sun gear 90 mesh with stationary jaw clutch teeth 96 formed on a stationary housing 98, thereby effective through sleeve 68 to resist rotation of sun gear 90. This setting of the change speed mechanism accounts for the low speed gearing or operation of the axle.

A shifting of sleeve 68 toward the right as viewed in Fig. 4 results in the release of the jaw clutch teeth 94 and 96 from engagement with one another while at the same time shifting a portion of the sun gear teeth 92 to mesh with jaw clutch teeth 100 formed on a plate 102 secured to the planet pinion carrier. With the sun gear teeth in engagement both with planet pinions 92 and teeth 100, the sun gear, ring gear and planet pinion gears are made to rotate as a unit and thus account for a 1 to 1 operation of the axle as driven from input shaft 104 thereof.

In the utilization of the gear shifting mechanism 10 to effect a shifting of the gears of the two speed axle, it is necessary for the operator of the vehicle employing same to actuate switch 18 so as to energize motor 11 effective to rotate screw 22. The rotation of the screw is then imparted to nut 24 resulting in the axial movement thereof on the screw which movement of the nut rotates the yoke 56 and arm 36. In the case of axial movement of the nut 24 vertically down the screw, as viewed in Fig. 2, the arm 36 is moved counter-clockwise resulting in moving finger 38 attached hereto in a counterclockwise direction and through the engagement of finger 38 with portion 48 of spring 34, the spring is wound up counter-clockwise. With a material amount of torque being transmitted through shiftable sleeve 68, the friction between the teeth thereof and the meshing gear through which the torque is being transmitted offers an unusually high amount of resistance to the shifting of sleeve 68. Upon the substantial relief of torque transmission through the shiftable sleeve 68, the force of the spring 34 by way of engagement with finger 42 of member 32 acts to pivot lever 64 clockwise about its axis as viewed in Fig. 1, to the dotted line position, and thus shift sleeve 68 to the position shown by Fig. 4.

Figure 5:
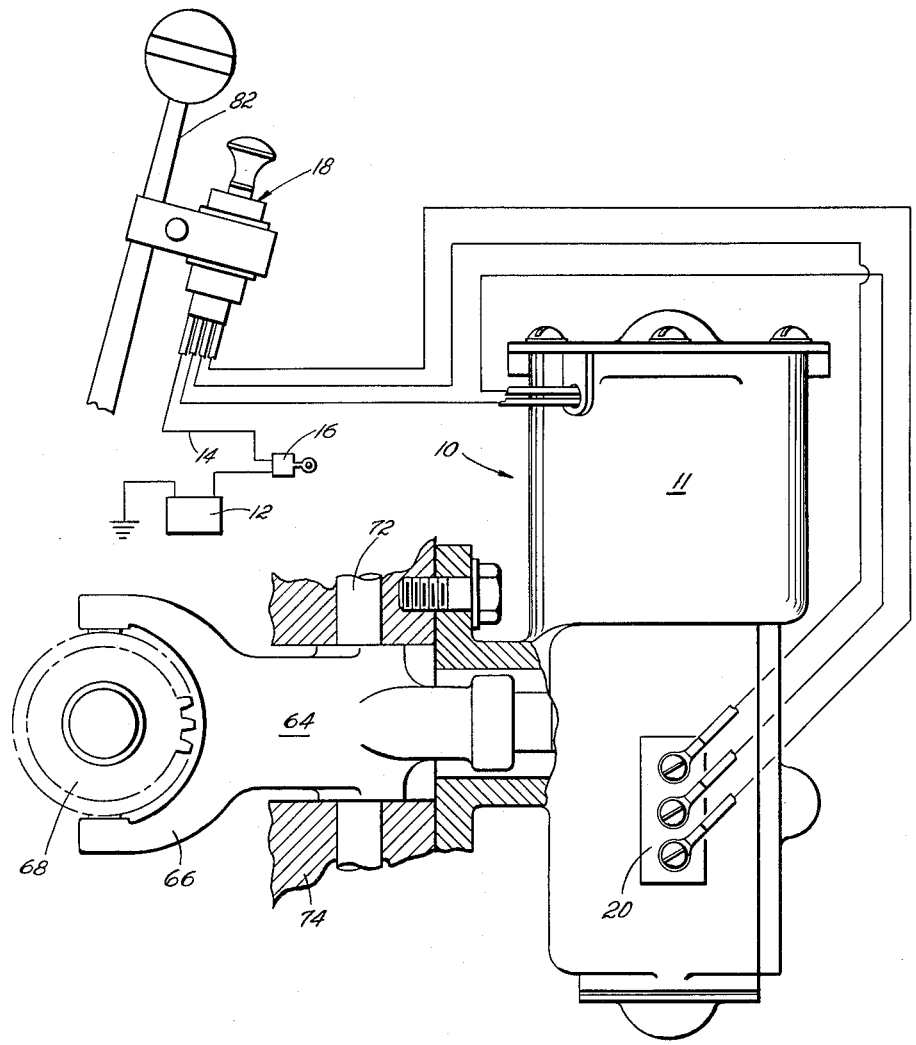
Fig. 5 is a partly fragmentary partly cross-sectionalized view of the gear shifting mechanism as associated with the shiftable gear of the axle and the manual shift switch and control circuit for the gear shifting mechanism.

As a means of informing the operator of the vehicle that a shift to low speed axle operation has been effected so that a resumption of vehicle acceleration can be had, a controlled signal light electrical circuit 106 is provided including a battery source of current 108, a vehicle ignition switch 110, a signal light 112 adapted to be arranged in a suitable place in the passenger compartment or cab of the vehicle and current conducting means or switch 114. Battery 108 and switch 110 preferably correspond to the battery and ignition switch 12 and 16 of Fig. 5 and normally would form a part of both circuits 14 and 106. Switch 114 is adapted to be mounted on a housing for the lever 64 and includes a housing 116, formed of suitable insulated material, a terminal post 118, connected in the circuit, a coil spring 120, arranged in the housing 116 having one axial extremity engaging a portion of the terminal post 118, and an axially movable member 122, including a head portion fitted in the housing 116, engageable with the end of the spring opposite from the terminal post, and a slender body portion 124 extending axially through one end of the housing 116 into the interior of the housing for the lever 64. Spring 120 serves the dual purpose of biasing the member 122 away from terminal post 118 and for conducting current between the post and member 122.

With the provision of switch 114 in circuit 106, it will be evident that upon the completion of a shift to high or 1 to 1 axle ratio wherein lever 64 is moved to the dotted line position of Fig. 1 by spring 34, the arm 76 will engage the extremity of body portion 124 of member 122 and by way of arm 76 being grounded complete circuit 106 and cause the signal light to be turned on. In so having the member 122 spring tensioned slight variations in the dotted line position of lever 64 shown by Fig. 4 will not fail to assure a completion of circuit 106 effective to switch on light 112. The signal light is preferably to be green in color so as to immediately indicate to the operator of the vehicle that he has a go ahead to accelerate the vehicle and proceed in high speed axle gear to ascend the grade he has encountered with maximum efficiency and speed.

Switch 114 is made to be operable to solely signal the completion of an up shift that is from low to high gear axle ratio since it is this stage of operation that requires the effective timed manipulation of the accelerator to obtain the maximum benefit from the two speed axle in the ascending of difficult grades whereby a quick and easy transition is made in the gear ratios without appreciable loss of vehicle momentum.

While this invention has been described in connection with certain specific embodiments, the principle involved is susceptible of numerous other applications that will readily occur to persons skilled in the art. The invention, therefore, is limited only as indicated by the scope of the appended claims.

What I claim is:

1. In combination with a pre-select shifting mechanism for a change speed transmission, means, engageable with the change speed transmission shiftable to alter the transmission speed ratio, and an electrical circuit including a source of electrical current, a signal light and a switch arranged in series, said switch being engageable by the shiftable means to complete the circuit therethrough to ground and provide for current flow therethrough effective to light up the signal light.

2. In combination with a pre-select shifting mechanism for a two speed transmission, lever means engageable with the change speed transmission shiftable between limits to change the transmission speed, and an electrical circuit including a battery source of current, a signal light and a current conducting means, said current conducting means being engageable by the shiftable means upon the completion of a selected shift to effect a completion of the circuit through the shiftable means to ground.

3. In combination with a pre-select shifting mechanism for two speed axle gearing, an electrical circuit grounded shiftable lever actuated by the pre-select shifting mechanism and engageable with the axle gearing, upon the material reduction of torque transmission through the axle gearing to be shifted, to change the speed ratio of the axle gearing, and an electrical circuit including a source of electrical current, a signal light and a spring tensioned current conducting means, said current conducting means being engageable by the shiftable lever to complete the circuit therethrough upon actuation of said lever to a position for high speed ratio gearing of the axle.

4. In combination with a change speed transmission and a pre-select shifting mechanism therefor including power storing means operative to effect a change speed operation of the transmission upon the material reduction of torque transmission through the transmission, a grounded shiftable means having a part engageable by the power storing means and another part engageable with the transmission for transmitting motion between the power storing means and transmission for the speed change thereof, and an electrical circuit including a source of current, a signal light and a current conducting means arranged in series, said current conducting means being engageable by the shiftable means for one position of operation thereof to complete the circuit through the grounded shiftable means.

5. A combination according to claim 4 wherein the transmission is a two speed change transmission and the shiftable means engages the current conducting means upon the shifting of the transmission to its high speed operation phase.

6. A combination according to claim 4 wherein the transmission is a two speed axle, wherein the power storing means is spring loaded and wherein the shiftable means is a lever and it engages the current conducting means upon the shifting of the axle to high speed operation thereof.

7. A combination according to claim 5 wherein the current conducting means includes a resiliently tensioned member and wherein the shiftable means is grounded and it engages the resiliently tensioned member.

8. In combination with a two speed axle and a pre-select shifting mechanism therefor including spring loaded power storing means operable to store power therein upon a shift selection of the mechanism and operable to expend said stored power to change the ratio of the axle, a shiftable lever engageably connected between the power storing means and the axle for transmitting the stored power of the power storing means to the axle for changing the ratio thereof, and an electrical circuit including in series a source of current, a signal light and a current conducting means, said lever being grounded and operative upon shifting thereof to high speed operation of the axle to engage the current conducting and complete the circuit to ground thereby lighting up the signal light.

9. A combination according to claim 8 wherein the signal light is green and the current conducting means includes a resiliently pressed member engageable by the shiftable lever.

References Cited in the file of this patent

UNITED STATES PATENTS

| 1,690,956 | Tokuhisa | Nov. 6, 1928 |
| 2,187,831 | Lange | Jan. 23, 1940 |
| 2,214,100 | Claytor | Sept. 10, 1940 |
| 2,610,518 | Goedeke et al. | Sept. 16, 1952 |